United States Patent
Hemmervall et al.

(10) Patent No.: US 9,478,845 B2
(45) Date of Patent: Oct. 25, 2016

(54) ARRANGEMENT FOR MOUNTING A DIRECTIONAL ANTENNA IN AN ADJUSTABLE INCLINED POSITION

(71) Applicant: CUE DEE AB, Robertsfors (SE)

(72) Inventors: Jan-Olof Hemmervall, Robertsfors (SE); Karl Martin Gustafsson, Norrkoplng (SE)

(73) Assignee: Cue Dee AB, Robertsfors (SE)

( * ) Notice: Subject to any disclaimer, the term of this patent is extended or adjusted under 35 U.S.C. 154(b) by 11 days.

(21) Appl. No.: 14/405,459

(22) PCT Filed: Jun. 10, 2013

(86) PCT No.: PCT/SE2013/000095
§ 371 (c)(1),
(2) Date: Dec. 4, 2014

(87) PCT Pub. No.: WO2013/187818
PCT Pub. Date: Dec. 19, 2013

(65) Prior Publication Data
US 2015/0136920 A1      May 21, 2015

(30) Foreign Application Priority Data
Jun. 11, 2012   (SE) .................................. 1200350-5

(51) Int. Cl.
| | |
|---|---|
| F16M 13/00 | (2006.01) |
| H01Q 1/12 | (2006.01) |
| F16B 5/02 | (2006.01) |
| F16M 13/02 | (2006.01) |
| H01Q 3/08 | (2006.01) |
| F16B 2/10 | (2006.01) |

(52) U.S. Cl.
CPC ............. *H01Q 1/125* (2013.01); *F16B 5/0233* (2013.01); *F16M 13/022* (2013.01); *H01Q 1/1228* (2013.01); *H01Q 3/08* (2013.01); *F16B 2/10* (2013.01)

(58) Field of Classification Search
USPC ......... 248/289.11, 299.1, 534, 538, 539, 540
See application file for complete search history.

(56) References Cited

U.S. PATENT DOCUMENTS

| | | | |
|---|---|---|---|
| 6,232,928 B1 * | 5/2001 | Zimmerman | H01Q 1/1242 343/882 |
| 6,480,172 B1 | 11/2002 | Sawyer | |
| 6,768,474 B2 * | 7/2004 | Hunt | H01Q 1/125 248/218.4 |

(Continued)

FOREIGN PATENT DOCUMENTS

| | | |
|---|---|---|
| EP | 2256857 | 12/2010 |
| FR | 2745423 | 8/1997 |

(Continued)

*Primary Examiner* — Steven Marsh
(74) *Attorney, Agent, or Firm* — Mark P. Stone

(57) ABSTRACT

An arrangement for mounting a directional antenna (10) in an adjustable inclined position to an approximately vertical supporting member (11) comprises a separate upper antenna bracket (12) and a separate lower antenna bracket (12). The two antenna brackets (12) are formed equal to each other and each comprises a first mounting member (13), intended to be mounted to the antenna (10), and a second mounting member (14), intended to be mounted to the supporting member (11). The two mounting members (13, 14) are connected to each other by an intermediate connection (15, 16) which is arranged to permit the two mounting members (13, 14) to be moved a limited distance in an approximately horizontal direction towards or away from each other and to become fixed in adjusted positions relatively to each other.

2 Claims, 3 Drawing Sheets

(56) References Cited

U.S. PATENT DOCUMENTS

Figure 4:
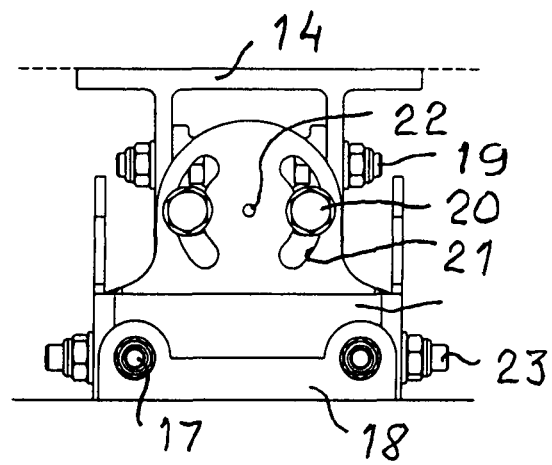

| | | | |
|---|---|---|---|
| 8,794,578 B2* | 8/2014 | Lin | H01Q 1/1228 248/218.4 |
| 2002/0196195 A1* | 12/2002 | Vermette | H01Q 1/125 343/882 |
| 2004/0119655 A1 | 6/2004 | Hunt | |
| 2010/0025559 A1* | 2/2010 | Rathbone | H01Q 1/1228 248/534 |
| 2013/0221182 A1* | 8/2013 | Renilson | H01Q 1/1228 248/534 |

FOREIGN PATENT DOCUMENTS

| | | |
|---|---|---|
| JP | 2004 200999 | 7/2004 |
| JP | 2012 034087 | 2/2012 |
| KR | 2011 000415 | 2/2011 |

\* cited by examiner

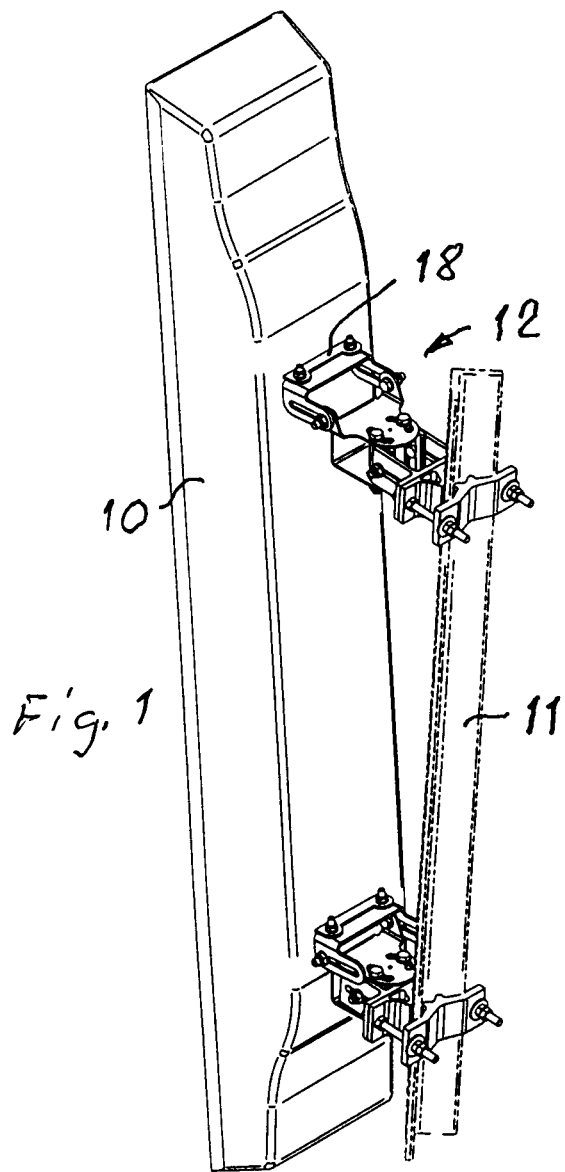

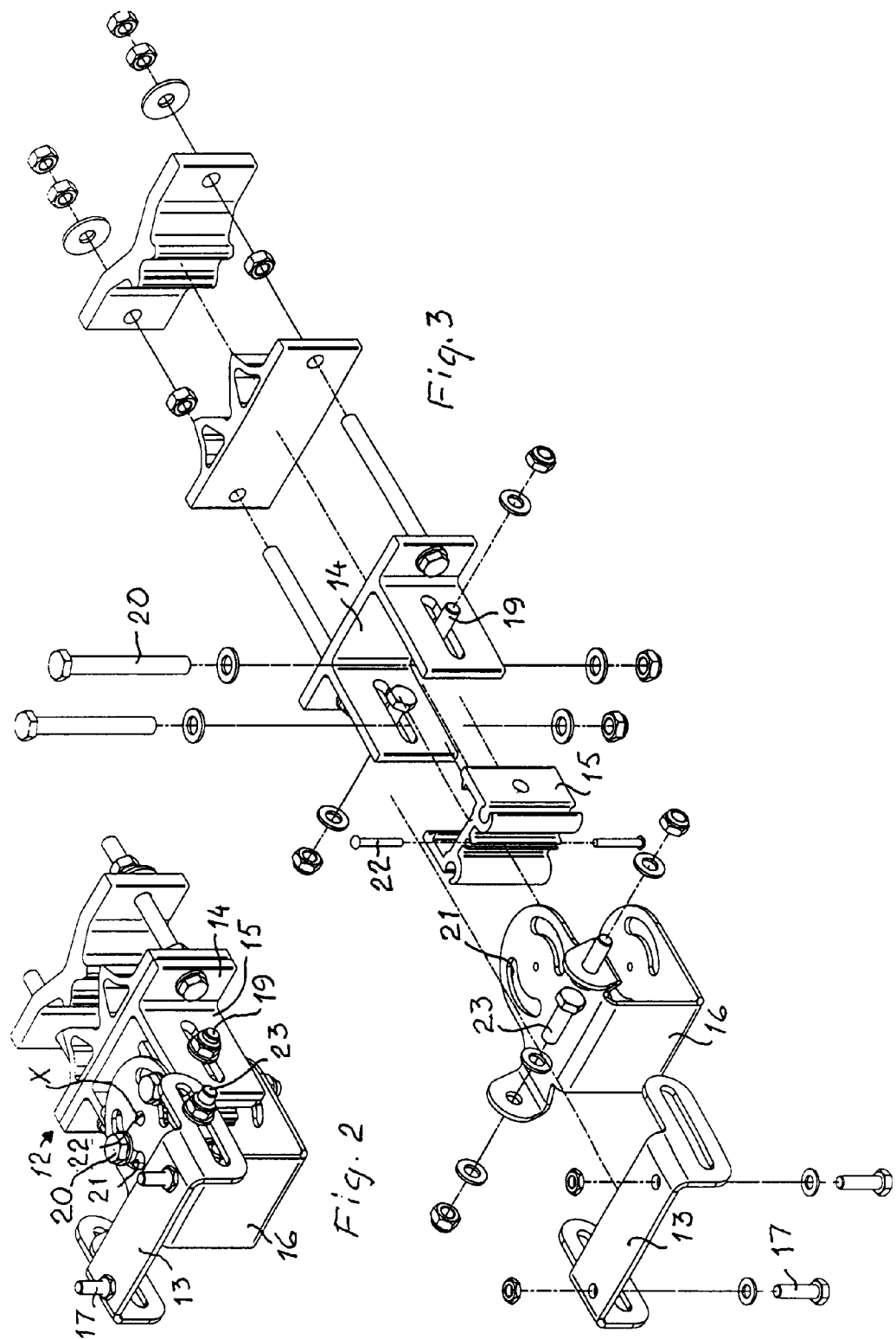

ARRANGEMENT FOR MOUNTING A DIRECTIONAL ANTENNA IN AN ADJUSTABLE INCLINED POSITION

The present invention relates to an arrangement for mounting a directional antenna in an adjustable inclined position to an at least approximately vertical supporting member by means of a separate upper antenna bracket and a separate lower antenna bracket located below the upper antenna bracket.

In previously known arrangements of the above kind it has been common practice to mount the antenna to the supporting member by utilizing two antenna brackets of mutually different design individually adapted to the installation in question. In practice, this use of mutually different upper and lower antenna brackets has been found to cause substantial costs.

The invention therefore has for its purpose to provide an improved arrangement of the above kind that can be produced at a substantially reduced cost.

The arrangement according to the invention proposed for the above purpose is primarily characterized in that the two antenna brackets are formed equal to each other and each comprises a first mounting member intended to be mounted to the antenna and a second mounting member intended to be mounted to the supporting member, said two mounting members being connected to each other by means of an intermediate connection that is arranged to permit the two mounting members to be moved a limited distance in an at least approximately horizontal direction towards or away from each other and to become fixed in adjusted positions relatively to each other.

The invention makes is possible to utilize a single universally usable kind of antenna bracket both for forming the upper antenna bracket and for forming the lower antenna bracket.

According to a preferred embodiment of the invention, said connection of each of the two antenna brackets may be arranged to permit a limited rotation of the mounting member, intended to be mounted to the antenna, relatively to the mounting member, intended to be mounted to the supporting member, around an at least approximately vertical axis and a fixation of the two mounting members in adjusted rotary positions relatively to each other. Hereby, the antenna may easily be adjusted in a variable lateral direction.

Further characteristics of the invention appear from claims 3 and 4.

Below, the invention is further described with reference to the accompanying drawings, in which FIG. 1 shows a perspective view of an arrangement according to an embodiment of the invention, selected by way of example, by which a directional antenna can be mounted in an adjustable inclined position to an at least approximately vertical supporting member and become supported by said member in an around an at least approximately vertical axis rotatable state, FIG. 2 shows a perspective view of one of two mutually equal antenna brackets contained in said arrangement and located at a vertical distance from each other, FIG. 3 shows an exploded view of the antenna bracket shown in FIG. 2 and FIG. 4 shows a top plan view of an antenna bracket.

In FIG. 1, reference numeral 10 designates a directional antenna formed as an elongate panel antenna and reference numeral 11 designates an at least approximately vertical supporting member for the antenna, consisting of a tower leg formed by an angle profile member. The antenna 10 is mounted in an adjustable inclined position to the supporting member 11 by means of two mutually equal antenna brackets 12 located at some distance above each other.

Each of the two antenna brackets 12 comprises a mounting member 13, intended to be mounted to the antenna 10, and a mounting member 14, intended to be mounted to the supporting member 11. The two mounting members 13, 14 are connected to each other by means of an intermediate connection 15, 16 permitting the two mounting members 13, 14 to be displaced in an approximately horizontal direction towards or away from each other and to become fixed in an adjusted position relatively to each other. Additionally, said connection 15, 16 is also arranged to permit a limited rotation of mounting member 13 relatively to mounting member 14 around an approximately vertical axis X and a fixation of the two mounting members 13, 14 in adjusted rotary positions in relation to each other.

The connection 15, 16 comprises a first connection member 15 that can be displaced in an approximately horizontal direction relatively to mounting member 14 and a second connection member 16 that can be rotated relatively to connecting member 15 around an approximately vertical axis X. The mounting member 13 can additionally be displaced in an approximately horizontal direction in relation to the connection member 16.

The mounting member 13 is provided with two threaded bolts 17 by which it can be secured to a mounting flange 18 of antenna 10. For mounting the mounting member 14 to the supporting member 11 one may use a clamping device of the kind shown in SE-C2 513 011 comprising two opposite clamping jaws. Alternatively, the mounting member 14 may be mounted to a building wall or the like by means of fastening screws or similar means.

The connection member 15 may be mounted to mounting member 14 and be fixed in adjusted position to the latter member by means of bolts 19. Moreover, the connection member 16 may be mounted on connection member 15 by means of bolts 20 received in arc-circular grooves 21. Centering pins 22 may be used for centering the connection member 16 around the rotation axis X. Finally, mounting member 13 may be mounted and fixed in adjusted position to connection member 16 by means of bolts 23.

The invention is not restricted to the embodiments shown in the drawings and above described. Instead, many other embodiments are feasible within the scope of the invention as set forth in the claims.

The invention claimed is:

1. Arrangement for mounting a directional antenna (10) in an adjustable inclined position to an at least substantially vertical supporting member (11), said arrangement comprising a separate upper antenna bracket (12) and a separate lower antenna bracket (12) located below the upper antenna bracket, wherein the two antenna brackets (12) are formed equal to each other and each comprises a first mounting member (13), mountable to the antenna (10), and a second mounting member (14), mountable to the supporting member (11), said two mounting members (13, 14) being connected to each other by means of an intermediate connection (15, 16) which is arranged to permit the two mounting members (13, 14) to be moved a limited distance in an at least substantially horizontal direction towards or away from each other and to become fixed in adjusted positions relative to each other;

wherein said connection (15, 16) of each of the two antenna brackets (12) is arranged to permit a limited rotation of the first mounting member (13), mountable to the antenna (10), relative to the second mounting member (14), mountable to the supporting member (11), around an at least substantially vertical axis (X) and a fixation of the two mounting members (13, 14) in adjusted rotary positions relative to each other;
wherein said connection (15, 16) comprises a first connection member (15) displaceable in a substantially horizontal direction relative to the second mounting member (14) mountable to the supporting member (11) and a second connection member (16), arranged to be rotated relative to the first connection member (15) around a substantially vertical axis (X); and
wherein the first mounting member (13) mountable to the antenna (10) is displaceable in a substantially horizontal direction relative to the second connection member (16).

2. Arrangement for mounting a directional antenna (10) in an adjustable inclined position to an at least substantially vertical supporting member (11), said arrangement comprising a separate upper antenna bracket (12) and a separate lower antenna bracket (12) located below the upper antenna bracket, wherein the two antenna brackets (12) are formed equal to each other and each comprises a first mounting member (13), mounted to the antenna (10), and a second mounting member (14), mounted to the supporting member (11), said two mounting members (13, 14) being connected to each other by means of an intermediate connection (15, 16) which is arranged to permit the two mounting members (13, 14) to be moved a limited distance in an at least substantially horizontal direction towards or away from each other and to become fixed in adjusted positions relative to each other;
wherein said connection (15, 16) of each of the two antenna brackets (12) is arranged to permit a limited rotation of the first mounting member (13), mounted to the antenna (10), relative to the second mounting member (14), mounted to the supporting member (11), around an at least substantially vertical axis (X) and a fixation of the two mounting members (13, 14) in adjusted rotary positions relative to each other;
wherein said connection (15, 16) comprises a first connection member (15) displaceable in a substantially horizontal direction relative to the second mounting member (14) mounted to the supporting member (11) and a second connection member (16), arranged to be rotated relative to the first connection member (15) around a substantially vertical axis (X); and
wherein the first mounting member (13) mounted to the antenna (10) is displaceable in a substantially horizontal direction relative to the second connection member (16).

* * * * *